H. J. STROHBACH.
COFFEE URN.
APPLICATION FILED DEC. 9, 1921.
1,423,547.
Patented July 25, 1922.
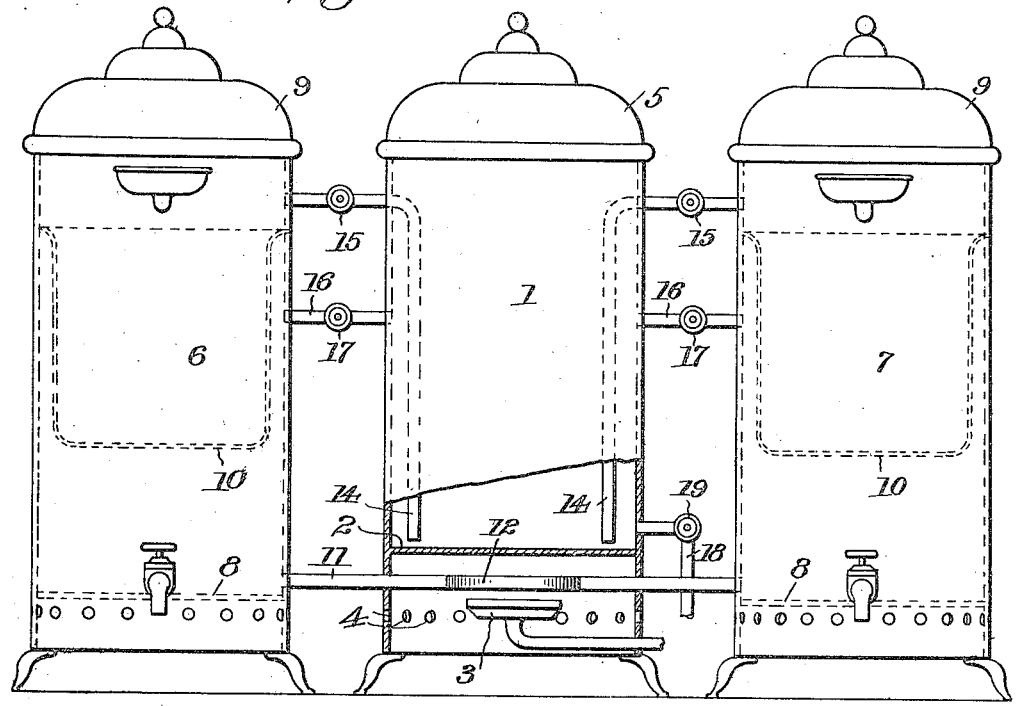
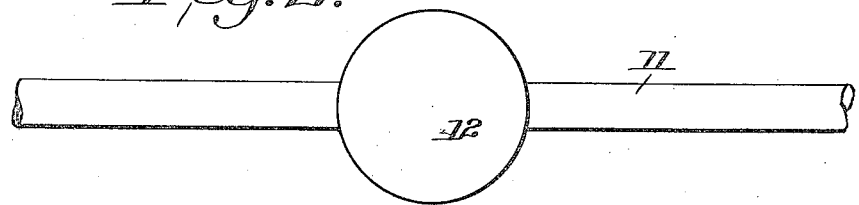
Inventor
Harry J. Strohback.
By Frederick V. Winters,
Attorney

UNITED STATES PATENT OFFICE.

HENRY J. STROHBACH, OF NEW YORK, N. Y.

COFFEE URN.

1,423,547. Specification of Letters Patent. Patented July 25, 1922.

Application filed December 9, 1921. Serial No. 521,164.

*To all whom it may concern:*

Be it known that I, HENRY J. STROHBACH, a citizen of the United States, residing at New York, in the county and State of New York, have invented certain new and useful Improvements in Coffee Urns, of which the following is a full, clear, and exact specification.

This invention relates to coffee urns and has for its object to provide improved and simplified means for simultaneously heating a battery of such urns.

Another object is to provide one or more coffee percolators connected to a boiler whereby hot water from the lower portion of the boiler may be conducted into said percolator or percolators above their coffee racks, and hot water may also be fed from the boiler into said percolator or percolators below said racks. Means is also provided for heating the water in the boiler and percolators from a single burner arranged below said boiler. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:

Figure 1 is a broken front elevation of a battery of coffee urns constructed and connected up substantially in accordance with this invention.

Figure 2 is a detailed plan view of the water conduit extending between the coffee urns and arranged immediately above the burner, and Figure 3 is a similar view of a modified form of conduit.

The boiler 1 is preferably made in the form of an upright cylinder having a bottom 2 spaced some distance above the lower edge of its walls, forming a compartment for housing the burner 3. The lower end portion of the walls of the boiler below the bottom 2 may be perforated, as at 4, to admit air for supporting the combustion of the burner. The top of the boiler 1 is fitted with any suitable form of air-tight cover 5 which may be screwed in place or otherwise securely fastened in position.

Percolators 6 and 7, respectively, are arranged at opposite sides of the boiler 1, each of said percolators being also preferably made in the form of an upright cylinder fitted with a bottom 8 arranged on a lower level than the bottom 2 of the boiler. Each percolator has a removable cover 9 and an interior coffee rack 10.

A conduit 11 extends through the lower portion of the boiler 1 between the burner 3 and the bottom 2 of said boiler, and communicates at opposite ends with the lower portions of the two percolators 6 and 7. Water is free to circulate in said conduit 11 from one percolator to the other, and in thus circulating must pass over the burner 3.

As illustrated in Figures 1 and 2, the conduit 11 has an enlarged portion 12 arranged immediately above the burner. Said enlargement 12 is preferably circular in form and of somewhat greater diameter than the burner, but the shape and dimensions of said enlargement may be changed, as well as the shape and size of the burner, without departing from the present invention. The provision of the enlargement in the conduit over the burner permits a larger amount of water to be quickly heated by the direct heat from the burner than is possible when the conduit is made of uniform size throughout its length, as suggested in Figure 3 where a straight pipe 13 is illustrated. It will be understood, however, that the straight conduit 13, or any other suitable form of pipe may be used instead of the conduit 11 having the enlargement 12, and good results be obtained.

Pipes 14 lead from the lower portion of the tank 1 to the upper portions of the percolators 6 and 7, and are fitted with valves 15 arranged between said boiler and percolators. Said pipes 14 enter the percolators above the coffee racks 10, and are designed to supply water from the boiler to the percolators for moistening the coffee in said racks. When the water is heated in the boiler to a sufficient degree, steam will form between the surface of the water and the cover 5. The pressure of this steam on the surface of the water is sufficient to cause water from the bottom of the boiler to pass through the pipes 14 to the upper portions of the percolators when the valves 15 are opened.

The boiler 1 is connected to the percolators 6 and 7 below the supports for the coffee racks 10 by pipes 16 fitted with valves 17, whereby water from said boiler may be supplied to said percolators for diluting the prepared coffee in the lower portions thereof below the racks 10. Water may be furnished to the boiler 1 by a pipe 18 preferably entering the same near its bottom 2. Said pipe 18 is fitted with a suitable cut-off valve 19.

When the coffee urn is in use, the flame from the burner 3 plays directly upon the enlarged portion 12 of the conduit 11, so that the water in the percolators, or the prepared coffee which will soon occupy the lower portions thereof will be quickly heated by reason of the circulation through said conduit. At the same time, the flame from the burner will indirectly heat the bottom 2 of the boiler 1, so that with said indirect heat from the burner together with the excess heat radiated by the enlarged portion 12 of the conduit 11, said boiler will also be quickly heated for raising the water therein to the desired steam-forming degree.

I claim:

1. The combination with a boiler, of a burner for heating said boiler arranged a short distance below its bottom, of a percolator at one side of the boiler, and a conduit extending from the percolator to a point over the burner and spaced below the bottom of said boiler, whereby said burner heats said conduit as well as the entire bottom of said boiler.

2. The combination with a boiler, of a burner for heating said boiler arranged a short distance below its bottom, of a percolator at one side of the boiler, and a conduit extending from the percolator to a point over the burner and spaced below the bottom of said boiler, whereby said burner heats said conduit as well as said boiler, the entire bottom of said conduit having an enlarged portion arranged directly above the burner and below the central portion of the bottom of said boiler for the purpose specified.

In testimony whereof, I have signed my name to this specification.

HENRY J. STROHBACH.